United States Patent [19] | [11] 4,408,630
Armstrong | [45] Oct. 11, 1983

[54] TORCH FOR VAPORIZABLE PRESSURIZED LIQUID

[76] Inventor: Richard J. Armstrong, 7 Jackes Ave., Suite 703, Toronto, Ontario, Canada

[21] Appl. No.: 361,039

[22] Filed: Mar. 23, 1982

[51] Int. Cl.$^{3}$ .............................................. F16K 49/00
[52] U.S. Cl. ........................................ 137/340; 62/52; 137/550; 137/614.2
[58] Field of Search ....................... 62/50, 52; 137/334, 137/340, 550, 614.2

[56] References Cited

U.S. PATENT DOCUMENTS 2,368,680 2/1945 Riise .................................... 137/340
3,132,478 5/1964 Thielman ............................ 137/334
3,491,789 1/1970 Callahan, Jr. et al. ............ 137/340

*Primary Examiner*—Ronald C. Capossela
*Attorney, Agent, or Firm*—Fetherstonhaugh & Co.

[57] ABSTRACT

This invention relates to a propane type gas burner that can be operated safely in an inverted position for an extended period of time and that has a reservoir of a glycol water type mixture to supply heat to vaporize liquified gas as it flows to the torch for burning.

6 Claims, 2 Drawing Figures

TORCH FOR VAPORIZABLE PRESSURIZED LIQUID

This invention relates to a valve assembly for a container of pressurized liquid fuel material that vapourizes under normal atmospheric conditions and that is adapted to vapourize the liquid material as it flows therethrough. The valve assembly is especially suited for use on a conventional propane hand-held soldering torch when it is held in an inverted position. The invention will be described in association with this use but it will be understood that the use of the valve assembly of the invention is not restricted to inverted hand-held propane torches.

A conventional hand-held propane torch comprises a small cylinder of liquified propane gas, a valve assembly for controllably permitting the escape of propane from the cylinder and a torch head on the valve assembly. When such a torch is held in an upright position with the valve assembly at the top of the cylinder there is always a certain amount of propane vapour at the upper end of the cylinder chamber overlying the liquified propane. Upon opening of the valve the vapours at the top of the chamber are drawn off and there is no difficulty in providing for appropriate expansion of these vapours through a conventional valve assembly so that they can be burned to provide a good flame.

When, however, the torch is inverted and the valve assembly underlies the propane tank, the vapour in the tank is at the opposite end to the valve assembly and overlying the surface of the liquid. In this case only liquid propane is available at the inlet to the valve assembly and when the valve assembly is opened liquid propane rather than vapourized propane flows therethrough.

In the design of these torches the orifice in the valve assembly is sized for vapour flow. When liquid passes through the valve assembly a very much greater quantity of fuel passes and the result is a large uncontrollable flame if the torch is held in the up-side-down position for any appreciable time.

Attempts have been made to overcome this condition. Valve assemblies of an expansion characteristic are used. These valves are designed with a substantial mass of metal adapted to provide a heat source with a view to providing the quantities of heat required by the liquid to vapourize it. It will be recalled that as propane vapourizes from the liquid state it takes in large quantities of heat called the heat of vapourization. By making the valve assembly of substantial mass, heat for vapourization is available from the mass of metal.

The concept of supplying heat of vapourization to expanding liquid propane from a body of metal of the valve assembly has been of limited value. It can be calculated that to fire a normal hand-held propane torch for one half an hour in an inverted position would require the heat stored in about four pounds of aluminum in order to vapourize the propane. Such a structure is obviously impractical. Generally speaking, it is not possible with the devices of the prior art to operate a propane torch safely in an inverted position for any appreciable amount of time.

It is an object of this invention to provide a valve assembly for a propane torch or like application that is capable of vapourizing liquid gas as it is drawn from the bottom of the vessel for a substantial period of time wherein the assembly is light weight, of simple construction and reliable.

With these and other objects in view, a valve assembly according to this invention for a container of pressurized liquid fuel material that vapourizes under normal atmospheric conditions, the valve assembly being adapted to vapourize the liquid material as it flows from the bottom of a container through the valve assembly, said valve assembly having an escape passage therethrough with a control valve therein to control the escape of fuel material from the container has the improvement of a jacket chamber in heat exchange relation with the escape passage to contain heat storage material that is liquid under normal atmospheric conditions and that solidifies at about the vapourization temperature of the pressurized liquid fuel material in the container to release latent heat of fusion, a pressure regulating expansion valve in said escape passage normally urged to a closed position to close the escape passage upstream of the jacket chamber but adapted to open in response to opening of the control valve to permit fuel material to flow from the container through the escape passage in heat exchange relation with the jacket chamber whereby latent heat of fusion of the heat storage material is supplied by latent heat of vapourization of the fuel material as it vapourizes in the area of said expansion valve.

The invention will be clearly understood after reference to the following detailed specification read in conjunction with the drawings.

Figures 1, 2:
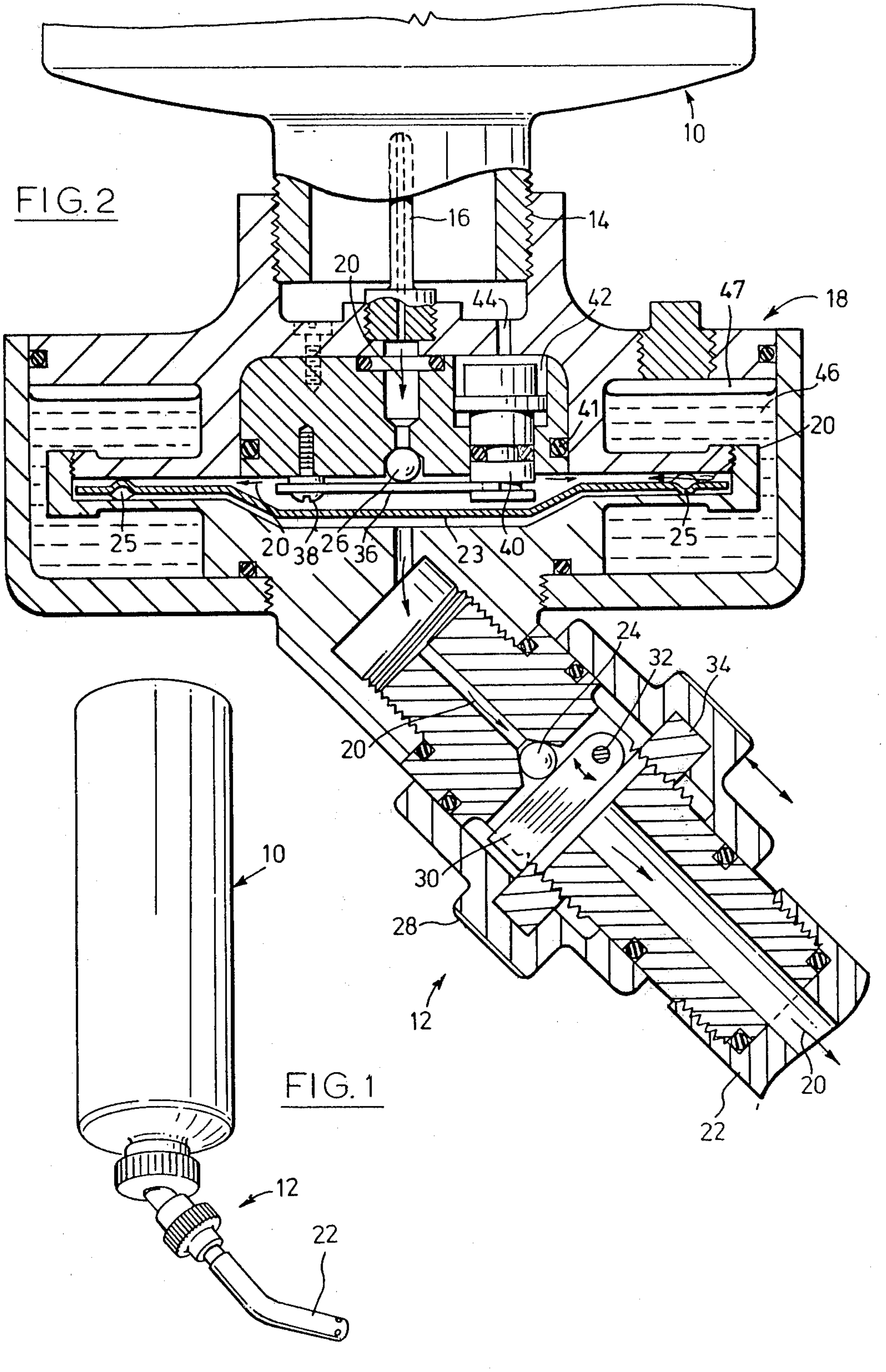
FIG. 1 is an illustration of a propane torch in an inverted position.
FIG. 2 is a sectional view through the valve assembly of the torch.

Referring to the drawings which illustrate a propane torch according to the invention, the numeral 10 refers to a liquid propane cylinder of conventional design. A torch assembly generally indicated by the numeral 12 is mounted at the top thereof. It will be appreciated that in FIG. 1 the torch has been illustrated in the inverted position because this is the position in which the operation of the valve assembly of this invention is most important.

The valve assembly screw threads onto the neck of the propane cylinder housing 10 as at 14. As it does so a tank stem 16 which is screw threaded into the assembly as illustrated pierces a seal in the tank and enters the propane tank. The tank stem 16 has a through opening that provides communication between the interior of the tank and the passages of the valve assembly. This is conventional with propane torches. They are commonly mounted in this way and propane is conducted to the valve assembly through a tank stem like the tank stem 16.

The valve assembly has a body generally indicated by the numeral 18. Under conditions of operation passage of propane from the tank 10 follows the path of the arrows 20 which terminates at a conventional torch burning nozzle 22. A dish-shaped baffle 23 is mounted between the opposed walls of the heat exchanger by spaced 25. The baffle in the embodiment illustrated is 0.016 inches thick and the spacing between the baffle and the opposed chamber walls is about 0.003 inches.

Within the path 20 there is located a shut-off valve 24 that seats in a conical seat as illustrated and a pressure regulating expansion valve 26 that seats in a conical seat as illustrated.

A sleeve 28 is threadable on the exterior of the body to move it axially thereof and control the valve 24 between an open and a closed position. In this connection it will be noted that a lever 30 pivotally mounted to the body as at 32 is held against the valve 24 by means of a ring 34 that is carried by the sleeve 28. By rotating the sleeve to carry it towards the free end of the body the lever 30 is permitted to swing in a counterclockwise direction. It will do this under the pressure of the liquified propane in the propane cylinder to initiate flow of liquid through the assembly as will be referred to later. It will also be apparent that by turning the sleeve 28 back in the opposite direction on the body the lever 30 is moved in a clock-wise direction to close the valve 24, as it is illustrated.

As noted above, when flow of propane is initiated by operation of the valve 24 the propane that flows into the valve assembly is in liquid form when the cylinder is in an inverted position. This assembly is especially efficient in vapourizing this liquid propane at a rate that it can be burned at the nozzle 22 without a resulting dangerous flame.

Also, as indicated above, when valve 24 is freed to open by rotation of sleeve 28 the pressure on the downstream side of the valve 26 is reduced and valve 26 opens in response to the pressure differential.

Under conditions of closure of the valve 24, pressure is the same on both sides of piston 40 and valve 26 is maintained closed by the closure pressure of spring 36 that is secured to the valve assembly housing at one end as at 38 and that connects with a piston 40 at its other end. Piston 40 has an O-ring mounted in a groove on its wall and reciprocates in a cylinder in the housing as illustrated. The lower end of the piston 40 communicates with chamber 42 that is open to atmosphere through passage 44. The screw mounting of the assembly to the propane cylinder is a loose one and the space between the cylinder is at atmospheric pressure.

The piston assembly acts in conjunction with the spring 36 as a pressure regulating device. The closure bias of the spring 36 and the atmospheric pressure on the lower end of the piston serve to provide a bias for the valve that is related to atmospheric pressure and is, therefore, substantially constant. In this way the expansion of liquid through the expansion valve 26 is pressure regulated. This particular concept of combining spring balance and atmospheric pressure to achieve pressure regulation is not novel and no claim is being made to this aspect of the operation per se. The atmospheric pressure serves as a constant reference. When the pressure downstream of the expansion valve 26 is less than the design pressure the spring 36 and its assembly yields to open the valve. It closes when it becomes less. If there were no reference to atmosphere opening and closing would vary with back pressure. The housing 18 has therein a chamber 46 which is filled with an ethylene glycol solution. Preferably an air space 47 is left in the chamber at filling. It has been found that a gas or vapour bubble such as an air bubble in the liquid aids in heat transfer from liquid to heat exchanger walls. The resulting action of the sloshing liquid as the torch is moved increases the heat transfer rate to the exchanger walls. Ethylene glycol solutions have the characteristic that they can be caused to freeze at about the same temperature that propane vapourizes. As propane vapourizes from a liquid to the vapour state it takes in large quantities of heat represented by the heat of vapourization. As glycol freezes and passes from the liquid to the solid stage it gives up large quantities of heat known as the latent heat of fusion. It has been found that by maintaining a relatively small body of glycol solution in heat exchange relation with liquid propane the glycol solution can supply sufficient heat to vapourize the propane so that a conventional propane torch can be operated in an inverted position for an extended period without any danger of liquid propane in the unvapourized condition reaching the flame.

In the case of a propane torch the temperature of the boiling propane as it changes from liquid to vapourized state at the expansion valve will vary depending upon the pressure in the propane tank and to some extent on the heat of the torch. Ethylene glycol can be made to solidify or freeze to release its latent heat of fusion at varying temperatures in the area of the varying temperatures that propane will boil by mixing ethylene glycol with water. Following, however, is a typical calculation which will explain the thermodynamics of the operation.

Ethylene glycol mixed with water to solidify at about 10° F. has a fusion of about 80 BTU's per pound. This is the material contained in the jacket chamber 46.

The heat of vapourization of propane at about 0° F., a commonly experienced temperature of boiling at the expansion valve of a propane torch, is about 172 BTU's per pound.

Thus, the vapourization of one pound of propane will absorb the heat of fusion from about 2.14 pounds of ethylene glycol solution.

A typical torch firing rate of a hand held propane torch is about 0.4 pounds per hour of propane. An hour of torch operation in an inverted position where liquid propane flows into the valve assembly would, therefore, require $2.14 \times 0.4 = 0.86$ pounds of ethylene glycol solution for each hour of operation.

Half an hour of operation in an inverted position is a relatively long period of operation so that a mass of ethylene glycol of about 0.43 pounds would be sufficient to supply the heat of vapourization to the expanding propane for a one half hour period.

The foregoing calculation considers only the heat given up by the ethylene glycol solution as it fuses from the liquid to the solid state. The solution would also have a sensible heat that would be used up before the solution gave up its heat of fusion. The sensible heat is, in the case of the glycol, the heat given up as the glycol reduces in temperature from room temperature to its freezing point where it gives up its heat of fusion. The sensible heat of the propane would also enter into the calculation and it is estimated that having regard to the sensible heats that about 0.35 pounds of ethylene glycol solution would maintain a propane torch in operation for about ½ hour for a torch firing rate of about 0.4 pounds per hour of propane.

By way of contrast it is calculated that an aluminum block at a temperature of about 40° F. would have to be about 4 pounds in weight in order to store the required amount of BTU's to vapourize the propane through a propane torch at a firing rate of about 0.4 pounds per hour. The specific heat of aluminum is about 0.214 BTU's per pounds per degree Fahrenheit, assuming that the torch operates outdoors at a temperature of about 40° F. and that propane boils at about 0° F. There is a 40° F. change in temperature. Over this temperature drop the heat given up by the aluminum block would be $0.214 \times 40 = 8.56$ BTU's per pound. For a torch firing rate of 0.4 pounds of propane per hour the weight of aluminum required would be:

$$(171.5\times0.4)/8.56=8 \text{ pounds}$$

Foregoing is for one hour of operation. For one half hour of operation the weight required would be about four pounds.

Thus, it will be apparent that the invention achieves in a practical manner a means for operating a hand held propane torch in an inverted position.

To be able to invert a hand held propane torch in an inverted position for safe operation over a period of time as long as one half an hour is a very significant and practical advance in propane torches. These torches are very convenient in the sense that they are small, hand-held and self contained, but a very serious limitation in their operation and use has been that they cannot safely be operated in an inverted position. As explained in the preamble when these torches are held in the inverted position liquid propane flows through the valve assembly and burns at an excessive rate to give a dangerous firing condition. The alternative in the plumbing trade where these torches are used extensively has been to provide large tanks to alternative fuels that must be wheeled around on a small cart. The torch supply from the supply tanks through a flexible supply line. To be able to avoid these cumbersome and heavy wheeled torch assemblies is a material step forward in the art and this invention permits it in a practical way.

The operation of the torch has been referred to in a general way. Essentially, the valve assembly is screw threaded onto a propane container to cause the tank stem 16 to enter the seal and connect the propane container to the valve assembly. At the time of mounting the valve 24 is manipulated to the closed position. There will be an immediate rush of pressurized propane into the passages of the valve assembly until the pressure in the passages downstream of the valve 36 equals the preset pressure. At this stage the valve 36 previously urged open by the rush of propane closes under the normal loading of its spring pressure and remains closed until the valve 24 is manually opened.

When valve 24 is manually opened pressure is reduced on the down side stream of valve 36 and valve 36 opens under the pressure of the propane in the tank. The loading on the spring 36 is adapted to maintain a maximum flow rate of the torch design under full open position of the valve 24. At lesser openings of the valve 24 the valve 36 will be less than full open.

The gas passes through the labyrinth passage indicated by the arrows and as it does so in liquid form it comes into heat exchange relation with the ethylene glycol in the jacket chamber. The area of the jacket chamber and the length of the jacket chamber is such that heat of fusion can be transferred from the glycol solution to the liquid propane gas to vapourize it as it passes the expansion valve 26. Thus, as the gas proceeds downstream of the valve 26 it is in vapour form and is ignited and burns at the nozzle 22.

Foregoing is the description of the operation of the device in inverted position.

When the device is used in the upright position there is propane vapour at the top of the hand-held propane container so that when the valve 28 is turned on the propane in the vicinity of the vapourizing valve 26 is already in vapourized form. When the valve 24 is manipulated to the open position this propane vapour proceeds through the torch and burns in the normal way. In this case it is not necessary that the ethylene glycol solution give up its heat of fusion and it does not do so except to the extent that might be necessary under some operating conditions.

While the invention has been described as it relates to a propane torch it will be appreciated that the invention has application to any situation where it is desired to supply a liquid fuel through a valve assembly where there is a requirement that the liquid fuel be vapourized prior to burning and that heat of vapourization be provided at the expansion valve. Embodiments of the invention other than the one illustrated will be apparent to those skilled in the art and it is not intended that the invention should be restricted to the embodiment illustrated.

The embodiments of the invention in which an exclusive property or privilege is claimed are defined as follows:

1. A valve assembly for a container of pressurized liquid fuel material that vapourizes under normal atmospheric conditions, the valve assembly being adapted to vapourize the liquid material as it flows from the bottom of a container through the valve assembly, comprising a body having an escape passage therethrough with a control valve therein operable between a closed and open position to control the escape of fuel material from the container, means forming a jacket chamber in heat exchange relation with the escape passage to contain heat storage material that is liquid under normal atmospheric conditions and that solidifies at about the vapourization temperature of the pressurized liquid fuel material to be used in the container with which the valve assembly is to be used to release latent heat of fusion, a pressure regulating expansion valve in said passage upstream of said jacket chamber, pressure regulating expansion valve control means responsive to the closed position of said control valve to close said pressure regulating expansion valve and responsive to an open position of said control valve to open said pressure regulating expansion valve and permit fuel material to flow from the container through the escape passage in heat exchange relation with the jacket chamber whereby latent heat of fusion of the heat storage material supplies the latent heat of vapourization of the fuel material as it vapourizes in the area of said expansion valve.

2. A valve assembly for a container of pressurized liquid fuel material that vapourizes under normal atmospheric conditions, the valve assembly being adapted to vapourize the liquid material as it flows from the bottom of a container through the valve assembly, as claimed in claim 1 wherein said container for pressurized liquid is of a size to be hand held.

3. A valve assembly for a container of pressurized liquid fuel material that vapourizes under normal atmospheric conditions, the valve assembly being adapted to vapourize the liquid material as it flows from the bottom of a container through the valve assembly, as claimed in claim 1 or claim 2 wherein said jacket chamber contains a heat storage mixture.

4. A valve assembly for a container of pressurized liquid fuel material that vapourizes under normal atmospheric conditions, the valve assembly being adapted to vapourize the liquid material as it flows from the bottom of a container through the valve assembly, as claimed in claim 1 or claim 2 where said heat storage mixture is an ethylene glycol water mixture.

5. A valve assembly for a container of pressurized liquid fuel material that vapourizes under normal atmospheric conditions, the valve assembly being adapted to vapourize the liquid material as it flows from the bottom of a container through the valve assembly, as claimed in claim 1 or claim 2 wherein said jacket chamber contains a heat storage mixture with a gas or vapour bubble to permit the mixture to slosh when it is under liquid conditions for the purpose of heat transfer to the jacket chamber.

6. A valve assembly for a container of pressurized liquid fuel material that vapourizes under normal atmospheric conditions, the valve assembly being adapted to vapourize the liquid material as it flows from the bottom of a container through the valve assembly, as claimed in claim 1 or claim 2 where said heat storage mixture is an ethylene glycol water mixture with a gas or vapour bubble to permit the mixture to slosh when it is under liquid conditions for the purpose of heat transfer to the jacket chamber.

* * * * *